United States Patent [19]
Anderson

[11] Patent Number: 4,800,575
[45] Date of Patent: Jan. 24, 1989

[54] MODEM FSK DEMODULATION METHOD AND APPARATUS

[75] Inventor: Steven L. Anderson, Huntsville, Ala.

[73] Assignee: Motorola, Inc., Schaumburg, Ill.

[21] Appl. No.: 91,479

[22] Filed: Aug. 31, 1987

[51] Int. Cl.$^4$ ............................................. H04L 27/14
[52] U.S. Cl. .................................... 375/80; 329/105; 329/110
[58] Field of Search ........................ 375/45, 80, 88, 90, 375/91, 94; 329/105, 110, 126, 166

[56] References Cited

U.S. PATENT DOCUMENTS

| | | | |
|---|---|---|---|
| 3,992,617 | 11/1976 | Epstein | 375/90 |
| 4,028,490 | 6/1977 | Epstein | 375/90 |
| 4,568,882 | 2/1986 | Single | 329/110 |
| 4,583,048 | 4/1986 | Gumacos et al. | 375/90 |
| 4,669,095 | 5/1987 | Hall | 375/90 |

Primary Examiner—Robert L. Griffen
Assistant Examiner—Stephen Chin
Attorney, Agent, or Firm—Charles L. Warren

[57] ABSTRACT

The frequency of a local clock in the receiving modem is selected to be one half of the sum of the frequency of the mark tone and the frequency of the space tone. The received tones are converted into digital words and the phase of each sample of a digital word is calculated relative to the modem clock. A predetermined number of the phase calculations are stored and the difference between one phase calculation and another phase calculation is made. The number of samples between the one and another is selected such that the difference calculation results in an approximately +90 degrees if the samples represent a mark tone and approximately −90 degrees if the samples represent a space tone. Thus, the sign of the phase difference calculation is determinative of the tone being received.

6 Claims, 1 Drawing Sheet

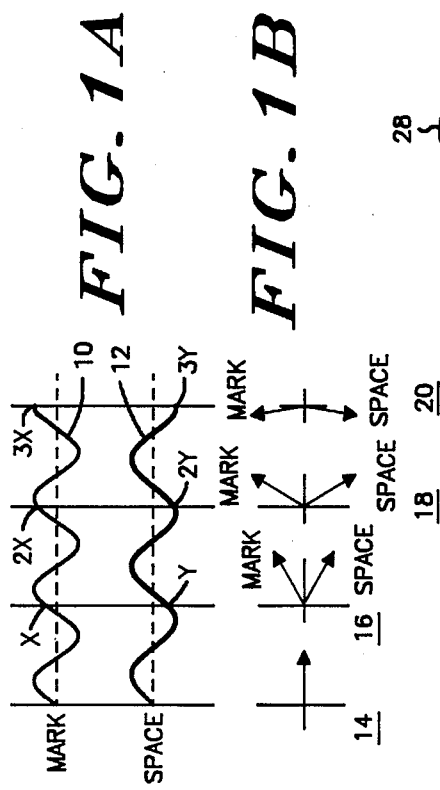
*FIG. 1A*
*FIG. 1B*
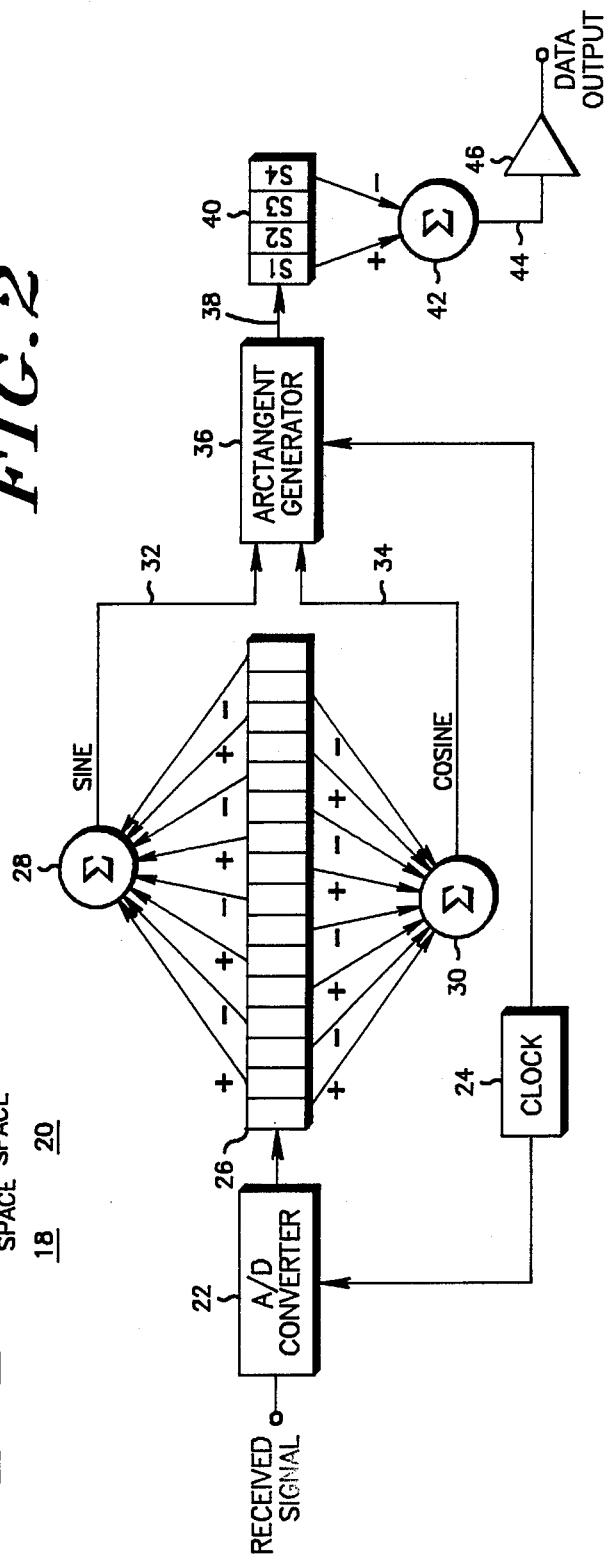
*FIG. 2*

4,800,575

MODEM FSK DEMODULATION METHOD AND APPARATUS

BACKGROUND OF THE INVENTION

This invention relates to modems which use frequency shift keying (FSK) as the modulation method and more specifically relates to the method, and corresponding apparatus, of demodulating data transmitted using FSK modulation.

Type 103 modems use FSK modulation in which two different frequency tones represent the two data states. Two pairs of tones are utilized depending upon whether the modem was the originating or answering modem. Phase locked loops and zero crossing detectors have been utilized as FSK demodulators. Both of these types of demodulation techniques require precise phase information of the two signalling tones utilized.

SUMMARY OF THE INVENTION

It is an object of the present invention to provide an FSK demodulation method which is not dependent on measurement of the absolute phase of the FSK tones.

An exemplary method according to the present invention includes conversion of the received tones into digital data. The relative phase of the digital data relative to the internal modem clock is calculated such as by separating the data into sine and cosine components, and utilizing an arc tangent function to determine the phase. The phase measurements are stored such as in a shift register. Since the modem reference clock is selected to have a frequency equidistant between the signalling tone frequencies, the lower frequency tone will have a phase lag relative to the modem clock and the higher frequency will have a leading phase relative to the modem clock. Since the phase difference between the tones and the modem clock increases for each cycle of modem clock, subtracting a current phase value from an appropriate prior phase value can yield an approximate 90 degree phase differential between the modem clock and either of the tones. The sign of the 90 degree phase difference determines which of the tones is being received.

BRIEF DESCRIPTION OF THE DRAWINGS

FIG. 1A illustrates exemplary mark and space waveforms relative to an intermediate clock frequency.

FIG. 1B illustrates relative to the clock rate shown in FIG. 1A, corresponding phasor diagrams.

FIG. 2 is a block diagram illustrating an embodiment of the present invention.

DETAILED DESCRIPTION

FIG. 1A illustrates a mark waveform 10 and a space waveform 12. The vertical lines represent one cycle time intervals of the modem clock which is selected to have a frequency between the mark and space frequencies. The clock frequency is preferably selected to be ½ of the sum of the mark frequency and the space frequency, i.e. equally spaced between the mark and space frequencies.

As seen in FIG. 1A, the mark waveform represents a frequency higher than the clock frequency since one clock interval intersects the waveform at greater than 360 degrees. The phase differential between 360 degrees and the phase of waveform 10 is represented as X. Similarly, the space waveform 12 is at a frequency lower than the clock frequency and hence it has a phase relative to the clock phase of less than 360 degrees indicated as Y. Since the clock, mark and space frequencies are fixed, the phase differential between the clock frequency and the mark and space frequencies increase linearly per clock cycle as indicated by the phase differentials 2X, 3X, and 2Y, 3Y.

For example, if the space frequency is 1070 Hertz (Hz) and the mark frequency is 1270 Hz, the clock frequency is preferably selected to be 1170 Hz which provides an equal frequency difference of 100 Hz between the clock and the signalling tones. This results in a per clock cycle phase difference of approximately 30.7 degrees between the clock and each of the signalling tones after one clock cycle; that is, X equals +30.7 degrees and Y equals −30.7 degrees. The phase differential equals the difference between the clock and tone frequency divided by the clock frequency times 360 degrees.

FIG. 1B contains a series of phasor diagrams illustrating the positions of the mark and space vectors at the corresponding clock intervals based upon the exemplary mark and space frequencies. Phasor diagram 14 illustrates that the mark and space vectors are coincident at 0 degrees. After one clock interval, phasor diagram 16 illustrates that the mark and space vectors are equidistance with respect to the clock phase; X = +30.7 degrees, Y = 30.7 degrees. The next phasor diagram 18 at the end of two clock periods illustrates the further divergence of the mark and space vectors; 2X = 61.4 degrees, 2Y = −61.4 degrees. The last phasor diagram 20 at the end of the third clock interval illustrates that the mark and space vectors are nearly 180 degrees out of phase; 3X = 92.1 degrees, 3Y = −2.1 degrees. It should be noted that with a phase difference of 180 degrees between the mark and space vectors, maximum immunity to noise is obtained. Such a phase difference is utilized in the embodiment of the present invention to obtain maximum noise immunity. However phase differences of +45 to +135 degrees and −45 to −135 degrees could be used.

Although the mark and space waveforms 10 and 12 are illustrated in Figure IA as beginning at 0 degrees, the same respective phase differentials X and Y would be achieved regardless of the initial phase of the mark and space waveforms relative to the beginning clock interval. Thus, the absolute phase of the mark and space frequencies relative to the modem clock is not important.

FIG. 2 illustrates an embodiment of the present invention in which analog to digital converter 22 converts the received analog signal which consists of the mark or space tone into a digital output word. Modem clock 24 which is preferably selected to be a frequency spaced equally between the mark and space frequencies provides clock information to A/D converter 22. The clock information to converter 22 preferably comprises a clock signal at an integer multiple of the clock frequency in order to provide more samples and hence greater precision in the calculations which will be explained below.

The digital output word from A/D converter 22 is processed by a conventional technique to derive the corresponding sine and cosine relative to the clock phase. A multiple tap shift register 26 stores the digital words. Alternate shift register taps are summed and subtracted by summation networks 28 and 30 a indicated. With a clock signal to A/D converter 22 of four times the frequency of clock 24, each adjacent shift register position represents 90 degree increments. Thus, alternate taps represent 180 degree differences which if summed with appropriate alternating summation polarities will result in the derivation of the sine and cosine. The sine output 32 and the cosine output 34 provide inputs to an arc tangent generator 36.

The purpose of arc tangent generator 36 is to provide digital outputs 38 consisting of digital words representative of the phase of the received signal. An angle (phase) can be determined based upon the sine and cosine of an angle by the well known mathematical arc tangent function. The generator 36 also receives a clock signal from clock 24 which may consist of the actual clock or a multiple of the clock rate. In this illustrative embodiment the clock signal consists of the clock rate. The digital output words 38 which are representative of the signal phase, provide inputs to a shift register 40 which contains samples S1-S4, each representing a calculated phase of the signal. A summation network 42 computes the difference between the first and fourth samples and provides a single bit output 44 representative of the arithmetic sign of the calculated difference. If sample S4 represents the beginning of a clock cycle, the S1 sample would represent the phase of the signal three clock periods later. As was previously illustrated in FIGS. 1A and 1B, three clock periods for the illustrative frequencies results in near optimum conditions in which the mark and space phases will differ by approximately 180 degrees. Thus, the arithmetic sign of the difference computed by summation network 42 corresponds to whether a mark or space is being received. A positive sign would indicate the phase was in the upper half of the phasor diagram 20 in FIG. 1B which indicates a mark is being received; a negative sign indicates the phase was in the lower half of the phasor diagram which is representative of a space. A buffer 46 provides a two state digital output representative of a mark and space.

If increased accuracy is desired, the output of clock 24 to arc tangent generator 36 could be increased by using an integer multiple of the clock frequency. If a clock multiple is used which would provide more frequent phase calculations 38, the shift register 40 would have to be increased a corresponding number of stages in order to maintain the 90 degree phase differential for summation network 42. For example, utilizing a clock input to generator 36 of twice the modem clock would require a shift register 40 with seven taps with summation network 42 comparing the difference between tap one and seven.

The embodiment of the present invention as described in reference to FIG. 2 can be implemented in hardware, software, or a combination thereof. Following the analog to digital conversion, the remainder of the method according to this invention can be implemented in software. Known implementations exist for sine, cosine and arc tangent mathematical computations in software. Shift registers 26 and 40 may consist of specified memory locations and summations accomplished by use of a microprocessor accumulator for basic arithmetic functions.

Although an embodiment of the present invention has been described and shown in the figures, the scope of the invention is defined by the claims appended hereto.

What is claimed is:

1. In a demodulator which receives data transmitted using frequency shift keying (FSK) modulation using mark and space tones having first and second frequencies, respectively, a method for demodulating said data comprising the steps of:
   generating a clock reference having a third frequency which is approximately equal to one half of the sum of said first frequency and said second frequency;
   converting said received tones into digital words;
   calculating the phase of each of said words relative to the phase of said clock reference;
   storing said calculated phase of each data word for a predetermined number of words;
   determining the difference between one and another of said predetermined number of stored words, the number of words between said one and another selected such that a phase difference of +45 to +135 degrees exists when one of said mark and space tones is being received and a phase difference of −45 to −135 degrees exists when the other of said mark and space tones is being received, the polarity of said phase difference between said one and another of the predetermined number of words being determinative of whether a mark or space is received.

2. The method according to claim 1 in which the calculation of the phase of each data word relative to said clock reference comprises the steps of calculating the sine and cosine of each data word relative to said clock reference, and determining the phase of said data word by calculating the arc tangent by using said sine and cosine.

3. The method according to claim 1 wherein the number of stored data words between said one and another is selected such that the phase difference is approximately +90 degrees when one of said mark and space tones is being received and is approximately −90 degrees when the other of said mark and space tones is being received.

4. A demodulator which receives data transmitted using frequency shift keying (FSK) modulation using mark and space tones having first and second frequencies, respectively, comprising:
   means for generating a clock reference having a third frequency which is approximately equal to one half of the sum of said first frequency and said second frequency;
   means for converting said received tones into digital words;
   means for calculating the phase of each of said words relative to the phase of said clock reference;
   means for storing said calculated phase of each data word for a predetermined number of words;
   means for determining the difference between one and another of said predetermined number of stored words, the number of words between said one and another selected such that a phase difference of +45 to +135 degrees exists when one of said mark and space tones is being received and a phase difference of −45 to −135 degrees exists when the other of said mark and space tones is being received, the polarity of said phase difference between said one and another of the predetermined number of words being determinative of whether a mark or space is received.

5. The demodulator according to claim 4 in which the means for calculating the phase of each data word relative to said clock reference comprises means for calculating the sine and cosine of each data word relative to said clock reference, and means for determining the phase of said data word by calculating the arc tangent by using said sine and cosine.

6. The modem according to claim 4 wherein the number of stored data words between said one and another is selected such that the phase difference is approximately +90 degrees when one of said mark and space tones is being received and is approximately −90 degrees when the other of said mark and space tones is being received.

* * * * *